UNITED STATES PATENT OFFICE.

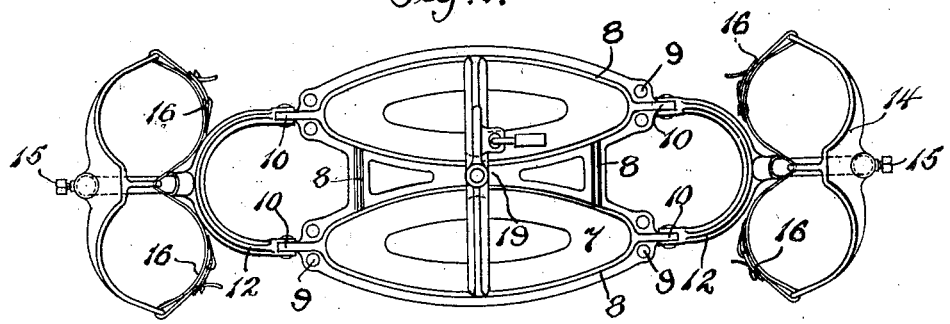
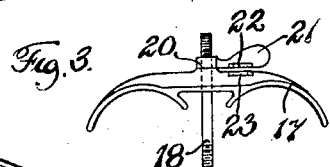
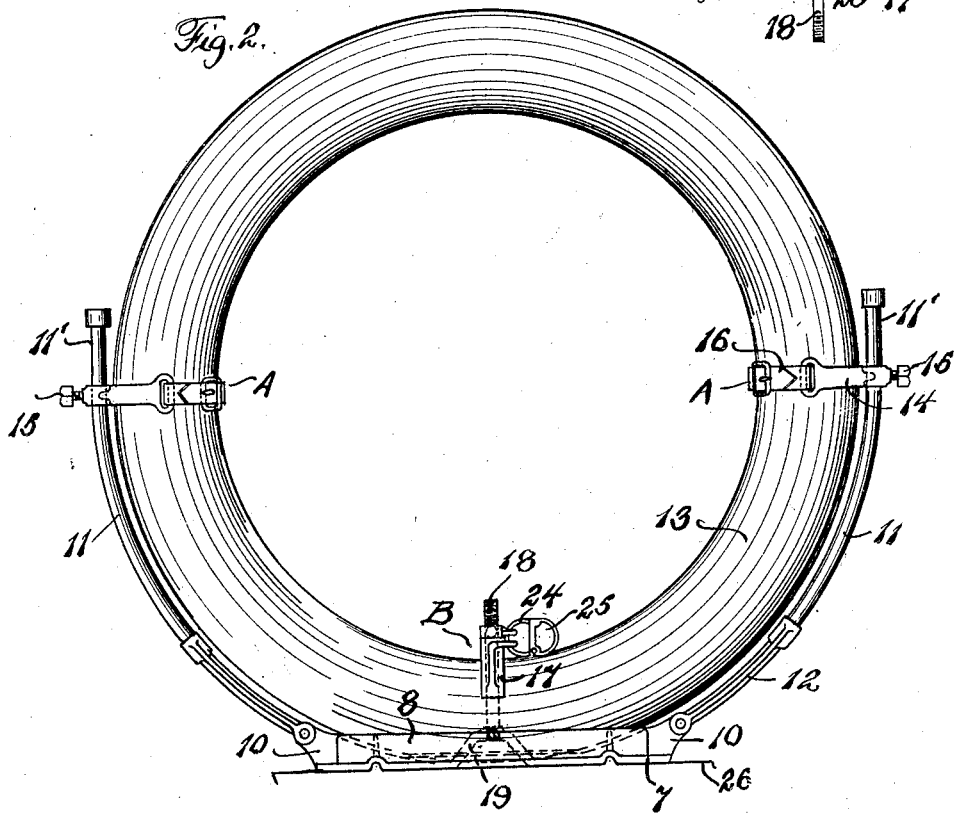

PEIRCE D. SCHENCK, OF DAYTON, OHIO.

TIRE-HOLDER.

1,112,661.  Specification of Letters Patent.  Patented Oct. 6, 1914.

Application filed August 10, 1912. Serial No. 714,356.

*To all whom it may concern:*

Be it known that I, PEIRCE D. SCHENCK, a citizen of the United States, residing at Dayton, in the county of Montgomery and State of Ohio, have invented certain new and useful Improvements in Tire-Holders, of which the following is a specification.

This invention relates to devices commonly known as tire holders, for carrying extra tires on automobiles and similar motor vehicles, and it has for its primary objects; the provision of an improved tire holder of simple and inexpensive construction; the provision of an improved universal tire holder which is readily adjustable to accommodate tires of different sizes, and the provision in a tire holder of an improved arrangement of locking mechanism. These together with such other objects as may hereinafter appear I attain by means of a construction which I have illustrated in preferred form in the accompanying drawings, wherein—

Figure 1 is a plan view of the improved tire holder, Fig. 2 is a side elevation of the holder showing the tires in place, and Fig. 3 is a side elevation of the locking mechanism.

In carrying out my invention I provide a base plate 7 having upstanding stiffening ribs 8 and provided with a plurality of bolt holes 9 which are spaced apart so that the base plate will be rigidly secured to the running board 26 of the vehicle. The base plate is provided at both ends with pairs of vertically disposed lugs 10, 10 on which the holding straps 11, 11 are pivotally mounted by means of the forked members 12, the straps being preferably composed of piping screwed into the ends of the members 12. The members 12 and the lower portion of the straps 11 are curved to correspond to the outline of the tires, but the upper portions 11' of the straps 11 are formed straight for a purpose which will hereinafter appear.

The tires 13 are secured in place by means of the clamps A—A and the clamp B. The clamps A comprise the metal yoke members 14 which are slidably mounted on the straps 11 and fastened in place thereon by means of the studs 15, and the leather straps 16, 16 which are provided with the usual buckles for adjustment.
The clamp B comprises a metal yoke member 17 (see Fig. 3) of the same general shape as that of the yokes 14, and is slidably mounted on a headless bolt 18 which is threaded into the boss 19 formed on the central portion of the base plate. The bolt 18 is adapted to lie between the pair of tires carried in the holder, and the yoke 17 is clamped and locked in place over the tires by means of the nut 20 which is provided with turning wing or handle 21 provided with an apertured lip or lug 22 adapted to aline with a similarly formed lug 23 formed on the yoke 17. After the tires have been clamped in place by the clamps A, the clamp B is locked by turning the handle 21 until the lugs 22 and 23 are in alinement, after which the locking bar 24 of a padlock 25 is passed through the lugs and snapped.

From the foregoing it will be seen that by pivotally mounting the straps 11 on the base plate and by slidably mounting the clamps A on the straps 11, the holder is adapted to carry all sizes of tires. The provision of the forked members 12 as a mounting for the straps 11 is particularly advantageous in that the construction lends rigidity to the straps, the extended bearing afforded serving to prevent the loosening of the straps and eliminate the rattling which would result from such loosening. By providing the clamping nut of the clamp B with a locking lug coöperating with a similar lug on the clamp a simple and convenient means of locking the tires on the holder is provided. The device is simple, rigid and cheap. Other advantages will occur to those familiar with the art.

Having thus described my invention and illustrated its use, what I claim as new and desire to secure by Letters Patent, is the following:

1. A tire holder comprising in combination an extended base plate having a tire receiving socket, a locking bar coöperating therewith to hold the tire in the socket, a pair of arms each pivoted at one end to an end of the base plate, and a yoke member adjustably carried on each arm for supporting the tire at a point above the socket.

2. A tire holder comprising in combination an extended base plate having a pair of tire receiving sockets extending longitudinally thereof and arranged side by side, a locking bar coöperating therewith to hold the tires in the sockets, a forked member at each end of the base the arms of which are pivoted to the base a substantial distance apart, a rod secured to the stem of each forked member, and a yoke member adjustably carried on each rod for supporting the tires at a point above the sockets.

In testimony whereof I have hereunto signed my name in the presence of the two subscribed witnesses.

PEIRCE D. SCHENCK.

Witnesses:
R. J. Low,
S. W. Froehle.